United States Patent Office 3,175,000
Patented Mar. 23, 1965

3,175,000
PROCESS FOR THE PREPARATION OF METAL SALTS OF α-HYDROXY-γ-METHYL MERCAPTO BUTYRIC ACID
Johannes W. Gielkens, Sittard, and Johannes H. C. A. Gregoire, Beek, Netherlands, assignors to Stamicarbon N.V., Heerlen, Netherlands
No Drawing. Filed Dec. 14, 1961, Ser. No. 159,452
Claims priority, application Netherlands, Dec. 14, 1960, 259,062
3 Claims. (Cl. 260—535)

The present invention relates to a novel process for preparing metal salts of α-hydroxy-γ-methyl mercapto butyric acid. This acid is the hydroxy analogue of the essential amino acid methionine and is useful as a supplement to animal food showing a deficiency in this amino acid. The metal salts of the present invention include, inter alia, the alkali metal salts and the alkaline earth metal salts.

As mentioned in U.S. Patent 2,745,745, an earth alkali metal salt, notably the calcium salt, of α-hydroxy-γ-methylmercaptobutyric acid, can be prepared by adding to a reaction mixture obtained by hydrolysis of α-hydroxy-γ-methylmercaptobutyronitrile with a solution of sulphuric acid in water, so much alkaline earth metal hydroxide or carbonate that the sulphuric acid used in the hydrolysis is converted to an insoluble alkaline earth metal sulphate and the α-hydroxy-γ-methyl mercaptobutyric acid is converted to the corresponding alkaline earth metal salt. This method has the disadvantage that the sulphuric acid must first be converted to the insoluble alkaline earth metal sulphate, which must subsequently be separated from the solution. Furthermore, the alkaline earth metal salt of the organic salt is not obtained in the pure state, but as a mixture with the ammonium salt, unless the reaction mixture is heated upon the addition of the alkaline earth metal compound. The patent also states that the free α-hydroxy-γ-methylmercaptobutyric acid can be directly obtained from the hydrolysis mixture by extraction with a water-immiscible organic solvent for the acid. However, it appears that the yields thus obtained are normally poor, so that this method as such is not suitable for practical application.

The principal object of the present invention is to provide an improved process for preparing the metal salts of α-hydroxy-γ-methylmercaptobutyric acid from reaction mixtures obtained by hydrolysis of α-hydroxy-γ-methyl mercapto butyronitrile with acids in the presence of water. More particular objects are to prepare these metal salts in high yield and in the pure state by a straightforward and simple way. The invention is of especial importance for preparing pure calcium-α-hydroxy-γ-methyl mercapto butyrate from reaction mixtures obtained by hydrolysis of the corresponding nitrile with sulphuric acid, although it will be recognized that the invention is not limited thereto.

According to the invention, the process in question involves first adding ammonium sulphate to a reaction mixture obtained by hydrolysis of α-hydroxy-γ-methyl mercapto butyronitrile with acid in the presence of water, the ammonium sulphate being added until the saturation concentration has practically been reached, thereafter separating off the resulting organic layer, treating this organic layer with an aqueous suspension or solution of a metal oxide, hydroxide, or carbonate, and isolating the resulting metal salt from the resulting solution.

It is a surprising aspect of the present invention that the mere addition of ammonium sulphate to the hydrolysis mixture is sufficient to effect separation of the α-hydroxy-γ-methyl mercapto butyric acid as an organic layer. The organic layer thus formed, which may contain over 90% of the acid, may be separated from the aqueous layer without any special measures being required. After separation, the aqueous layer may, if desired, be extracted, so as to obtain the highest possible yield. This extraction has proved to give much better results than can be obtained by extraction without previous addition of ammonium sulphate. Particularly suitable extraction agents are: polar solvents, such as alcohols, typically n-butanol, amyl alcohol and cyclohexanol; aldehydes, e.g. benzaldehyde; ketones, such as methyl propyl ketone; acids, for instance caprylic acid; esters, e.g. ethyl acetate; ethers, for instance diethylether; and halogen alkanes, typically, chloroform. In general, the use of diethylether is preferred.

The separated organic layer can be directly treated with the aqueous solution or suspension of the metal oxide, hydroxide, or carbonate. If desired, the extract obtained by the extraction of the aqueous layer may be simultaneously heated with this solution or suspension. Normally it is recommended first to evaporate the extraction agent, or at least the greater part thereof. However, it may be advantageous, particularly if ether is used as extraction agent, to treat this extract directly with the aqueous solution or suspension. This is preferably done in such a way that the said extract is added to a hot solution or suspension of the oxide, hydroxide or carbonate with the result that the ether evaporates at the same time.

Whether the metal is used in the form of the oxide, the hydroxide, or the carbonate will in general be determined by the cost involved. In the preparation of the calcium salt, the use of calcium carbonate is usually preferred but calcium oxide or calcium hydroxide may also be used. In the preparation of alkali metal salts, the metal oxide, hydroxide, or carbonate is by preference used in the calculated or theoretical amount, but in other cases larger amounts may also be used. In any event, the amount of water present must be such that the resulting metal salt of α-hydroxy-γ-methyl mercapto butyric acid remains in solution.

After being treated with the metal oxide, hydroxide, or carbonate, and after filtration of any undissolved components, the metal salts obtained can be recovered from the solution by evaporation and/or crystallization. In some cases it may be advantgeous to remove any organic impurities present before the evaporation by extraction with a solvent, for instance, with ether. It is also possible for the metal salts to be further purified by recrystallization, but in most cases the salts prepared according to the invention are sufficiently pure to be used as a supplement without this measure being taken.

The invention is illustrated, but not limited, by the following example.

*Example*

α-Hydroxy-γ-methyl mercapto butyronitrile was prepared by reacting 52 g. (0.5 mol.) of β-methyl mercapto propionaldehyde with prussic acid, and subsequent hydrolization was effected by adding 73 g. of 72% sulphuric acid (0.54 mol.) in 1.5 hours at a temperature of 30–35° C. Thereafter, the hydrolysis mixture was diluted with 250 ml. of water and then boiled for 1.5 hours under reflux. After the reaction mixture had been cooled to room temperature (20–25° C.), ammonium sulphate was added to the reaction mixture until the saturation concentration had been reached. This caused the formation of an organic layer and a water layer. The organic layer was removed and this layer was then treated with a suspension of 25 g. (0.25 mol.) of calcium carbonate in 1 litre of water. A small amount of insoluble product which remained was filtered off, and, after extraction with ether, the aqueous filtrate was evaporated to a volume of approximately 200 ml. under reduced pressure. The precipitated product was filtered off and dried in a vacuum drying stove at 100° C.

Weight of the product after drying was 61.2 grams. From the mother liquor another 11 g. of light-colored product were recovered by evaporating to dryness. This light-colored product was recrystallized from water to yield 8 g. of pure product. When the aqueous layer remaining after removal of the organic layer formed by the initial addition of ammonium sulphate was extracted with ether, a further 7.9 g. of pure product were obtained. Consequently, the total yield of pure calcium-$\alpha$-hydroxy-$\gamma$-methyl mercapto butyrate amounted to 77.1 g. (91.2% with respect to $\beta$-methyl mercapto propionaldehyde). It was a hygroscopic substance having a decomposition temperature of >300° C. Elementary analysis of $C_{10}H_{18}O_6S_2Ca$:

Calculated.—C=35.48%, H=5.36%, O=28.37%, S=18.95%, Ca=11.84%.

Found.—C=35.4%, H=5.7%, O=28.2% (difference), S=19.0, Ca=11.7%.

The above analysis confirmed that the product was the calcium salt of $\alpha$-hydroxy-$\gamma$-methyl mercapto butyric acid.

It will be appreciated that various modifications may be made in the invention described herein without deviating from the scope thereof. For example, there may be used any reaction mixture obtained by hydrolysis of $\alpha$-hydroxy-$\gamma$-methyl mercapto butyronitrile with an acid in the presence of water. Sulphuric acid is a typical acid for this purpose but other acids may be used as recognized in the art. Usually, these reaction mixtures will comprise about 20 to 50% by weight of hydrolysis product per 100 parts of water.

The amount of ammonium sulphate added to the reaction mixture will necessarily vary but, in any case, should be sufficient to reach, or essentially reach, the saturation concentration of the reaction mixture. By saturation concentration is meant the amount of ammonium sulphate which can be dissolved in the reaction mixture before any of the ammonium sulphate precipitates out of solution. Usually the amount of ammonium sulphate which is added will fall within the range of 50 to 70 parts by weight, per 100 parts of the starting reaction mixture, although it will be appreciated that this is given only for illustrative purposes. The important feature is that the ammonium sulphate be added in an amount sufficient to practically reach the saturation concentration.

The concentration and amount of the aqueous solution or suspension of metal oxide, hydroxide or carbonate can also be widely varied. However, as noted heretofore, the amount of water added by means of this solution should be sufficient to keep the desired metal salt of $\alpha$-hydroxy-$\gamma$-methyl mercapto butyric acid in solution. Usually, the amount of water added by means of the aqueous solution or suspension will fall within the scope of 1700 to 2000% of the weight of the separated organic liquid layer.

The scope of the invention is defined in the following claims wherein:

1. In a process for preparing a metal salt of $\alpha$-hydroxy-$\gamma$-methyl mercapto butyric acid from a reaction mixture obtained by hydrolyzing $\alpha$-hydroxy-$\gamma$-methyl mercapto butyronitrile to $\alpha$-hydroxy-$\gamma$-methyl mercapto butyric acid using sulphuric acid in the presence of water, the steps of adding ammonium sulphate to said reaction mixture until the saturation concentration has been essentially reached, separating the resulting organic layer, treating the separated organic layer with an aqueous metal compound selected from the group consisting of alkali metal and alkaline earth metal oxides, hydroxides and carbonates, and isolating the metal salt thus obtained from the resulting solution.

2. The process of claim 1 wherein said metal compound is calcium carbonate.

3. In a process for preparing calcium-$\alpha$-hydroxy-$\gamma$-methyl mercapto butyrate from the reaction mixture obtained by hydrolyzing $\alpha$-hydroxy-$\gamma$-methyl mercapto butyronitrile to the corresponding acid by means of sulphuric acid, the steps of adding ammonium sulphate to said reaction mixture at room temperature until the saturation concentration for said sulphate has been substantially reached whereby an organic liquid layer is formed, the amount of ammonium sulphate added being between 50 and 70 parts by weight per 100 parts of said reaction mixture, the latter containing 20–50 parts of said corresponding acid per 100 parts of water; separating off said organic liquid layer and treating the same with a suspension of calcium carbonate in water, the amount of water in said suspension being sufficient to maintain the resulting calcium salt of $\alpha$-hydroxy-$\gamma$-methyl mercapto butyric acid in solution, filtering off any undissolved components, and then isolating the resulting calcium salt from the solution by evaporation.

References Cited by the Examiner

UNITED STATES PATENTS 2,745,745   5/56   Blake et al.

OTHER REFERENCES

Perry et al.: Chemical Engineer's Handbook, 3d. ed., pages 320 and 715 (1950).

LORRAINE A. WEINBERGER, *Primary Examiner.*

LEON ZITVER, *Examiner.*